United States Patent [19]

Makino et al.

[11] Patent Number: 4,581,726

[45] Date of Patent: Apr. 8, 1986

[54] ULTRASONIC DISTANCE MEASURING APPARATUS

[75] Inventors: Hiroshi Makino, Hirakata; Hiroshi Iwata, Nara, both of Japan

[73] Assignee: West Electric Co., Ltd., Osaka, Japan

[21] Appl. No.: 488,163

[22] Filed: Apr. 25, 1983

[30] Foreign Application Priority Data

Apr. 28, 1982 [JP]  Japan ................................. 57-71810

[51] Int. Cl.⁴ .......................................... G01S 15/10
[52] U.S. Cl. ........................................ 367/99; 367/902
[58] Field of Search .................. 367/87, 99, 107, 900, 367/902

[56] References Cited

U.S. PATENT DOCUMENTS 4,307,456  12/1981  Ise et al. ........................ 367/900 X

Primary Examiner—Richard A. Farley
Attorney, Agent, or Firm—Stevens, Davis, Miller & Mosher

[57] ABSTRACT

In an ultrasonic distance measuring apparatus producing distance data representing a distance to an object by transmitting and receiving an ultrasonic wave, a sensor detects variation in the temperature and/or humidity of the atmosphere, and a compensator compensates for variation in propagation characteristic of the ultrasonic wave caused by the variation in the temperature and/or humidity respectively.

8 Claims, 14 Drawing Figures

ULTRASONIC DISTANCE MEASURING APPARATUS

BACKGROUND OF THE INVENTION

1. Field of the Invention

The present invention relates to an ultrasonic distance measuring apparatus for producing data on a distance to an object by transmitting and receiving an ultrasonic wave, or more in particular to an ultrasonic wave distance measuring apparatus comprising means for detecting variations in the humidity and temperature of the atmosphere and means for compensating for variations in the propagation characteristics of the ultrasonic wave caused by the variations in temperature or humidity.

2. Description of the Prior Art

Figure 1A:
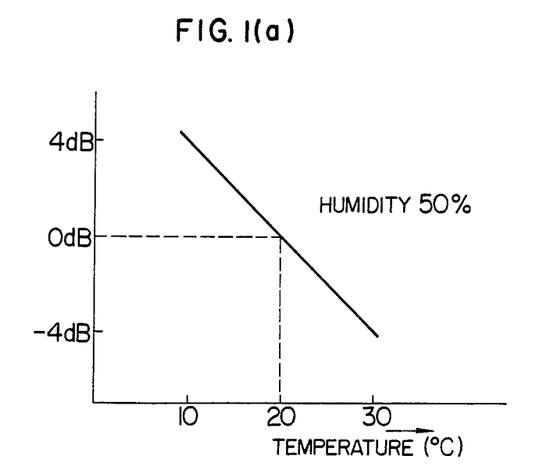
FIGS. 1(a) and 1(b) are characteristic diagrams showing change of the level of the received ultrasonic wave signal as against humidity and temperature of the atmosphere respectively.
Figure 1B:
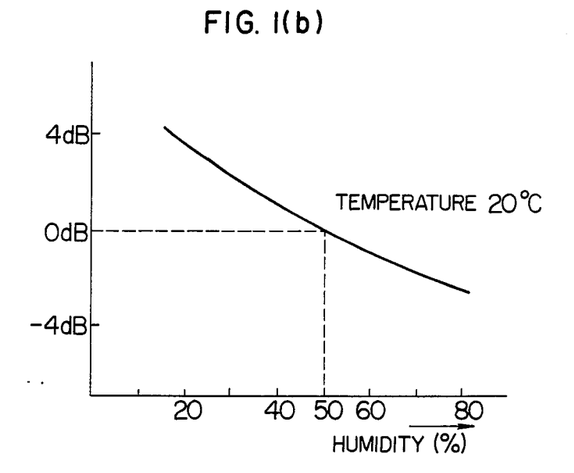

Generally, the ultrasonic wave propagating in the atmosphere is attenuated in proportion to the distance to an object. The amount of attenuation, however, depends to a considerable measure on the characteristics such as temperature and humidity of the atmosphere. Taking as a reference level of the received signal the level at the temperature of 20° C. and the humidity of 50%, for example, the received signal level undergoes the variations as shown in FIGS. 1(a) and 1(b) by change of temperature and humidity respectively.

Now, let us discuss modes that variations in the atmospheric characteristics affect the operation of an ultrasonic distance measuring apparatus.

An ultrasonic distance measuring apparatus using an ultrasonic wave, which is implemented to produce distance data from the period of time required from the transmission of the ultrasonic wave transmitted toward an object to the reception of the wave reflected on the object and must always perform the operation of detecting whether or not the reflected signal has been received and detect and set the receiving time. Generally, this purpose is attained in such a way that the received signal is compared with a reference level set above a noise level, and whenever the level of the received signal exceeds the reference level, it is decided that the reflected wave is received at that time point. In the even that the level of the received signal changes with change in the characteristics of the atmosphere as described above, however, the time point when the reflected wave is assumed to have been received by the detecting operation naturally undergoes a change, with the result of changing the time length from the transmission to the reception of the ultrasonic wave.

The variation in the time length from the transmission to the reception of an ultrasonic wave results in changing distance data with change in the temperature or humidity despite that the object remains at a predetermined fixed distance from the distance measuring apparatus. This poses a great problem of the impossibility of producing accurate distance data.

In other words, the variation in the level of the received signal due to variation in the characteristics of the atmosphere brings a great adverse effect on the accuracy of the distance measuring operation of an ultrasonic distance measuring apparatus.

SUMMARY OF THE INVENTION

It is an object of the present invention to provide an ultrasonic distance measuring apparatus which is capable of compensating for variations in the propagation characteristics of the ultrasonic wave caused by change of the characteristics of the atmosphere through which the ultrasonic wave propagates.

Another object of the present invention is to provide an ultrasonic distance measuring apparatus in which variations in the propagation characteristics of an ultrasonic wave due to change in the characteristics of the atmosphere through which the ultrasonic wave propagates are compensated for by controlling the level of the received signal in accordance with the change in the atmospheric characteristics.

Still another object of the present invention is provide an ultrasonic distance measuring apparatus in which the variation in the propagation characteristics of the ultrasonic wave caused by change of the characteristics of the atmosphere through which the ultrasonic wave propagates are compensated for by controlling the transmission level in accordance with the change in the characteristics of the atmosphere.

BRIEF DESCRIPTION OF THE DRAWINGS

FIG. 3(a) to (f) show waveforms produced at predetermined points in the circuit of FIG. 2.

DESCRIPTION OF THE PREFERRED EMBODIMENTS

An ultrasonic distance measuring apparatus according to the present invention which is capable of compensating for variation in the propagation characteristics of an ultrasonic wave caused by change of the characteristics of the atmosphere will be explained in detail below with reference to the accompanying drawings.

Figure 2:
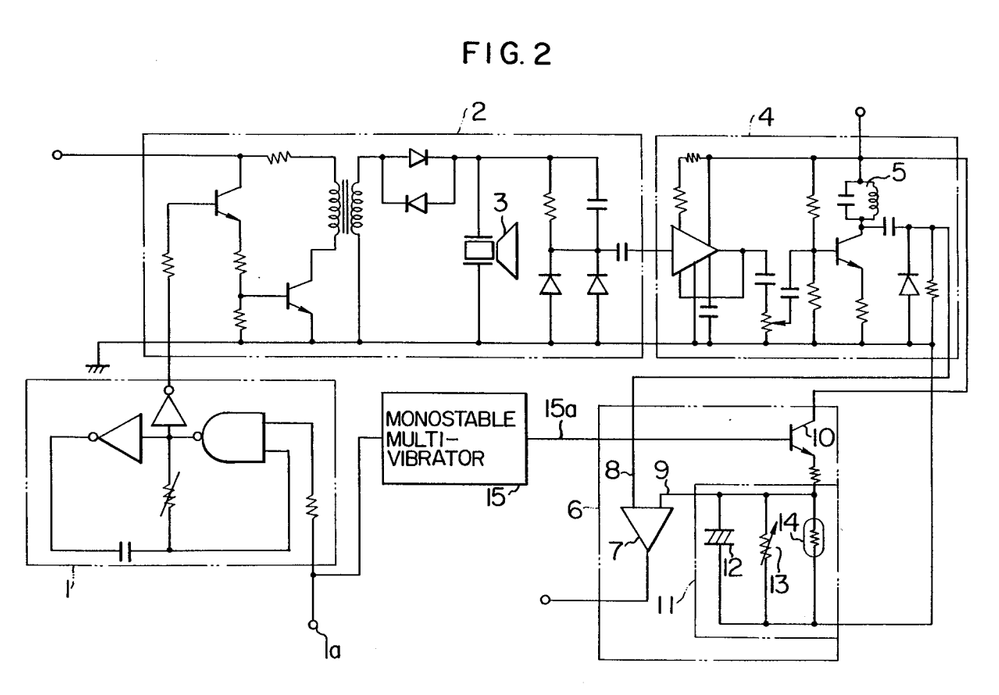
FIG. 2 shows a circuit of the ultrasonic distance measuring apparatus according to an embodiment of the present invention.

A partial diagram of the essential parts of the ultrasonic distance measuring apparatus according to an embodiment of the present invention which is capable of compensating for variation in the level of the received signal caused in variation in the atmospheric temperature, is shown in FIG. 2. In FIG. 2, reference numeral 1 designates an oscillator circuit adapted to oscillate at a frequency corresponding to a resonant point of an ultrasonic sensor (transducer) 3, and numeral 2 a transmission-receiving circuit controlled by the oscillator circuit 1 for causing the ultrasonic wave sensor 3 to transmit and receive the ultrasonic wave. Numeral 4 designates a received signal amplifier circuit for amplifying the signal received by the transmission-receiving circuit 2. The amplifier circuit 4, which includes a resonance circuit 5 adapted to resonate selectively at the resonance frequency mentioned above, produces an amplified signal of only the desired received signal and applies it to an input terminal 8 of a comparator 7 of a comparison circuit 6. Numeral 9 designates the other input terminal of the comparator 7, which is connected to a reference voltage setting circuit 11 including a parallel connection of a capacitor 12, a variable resistor 13 and a thermosensitive element 14 such as a thermistor. Numeral 10 designates a transistor the operation of which is controlled by a monostable multivibrator circuit 15 operated simultaneously with the oscillator circuit 1 and producing a pulse signal of a desired optimum pulse width.

Figure 3:
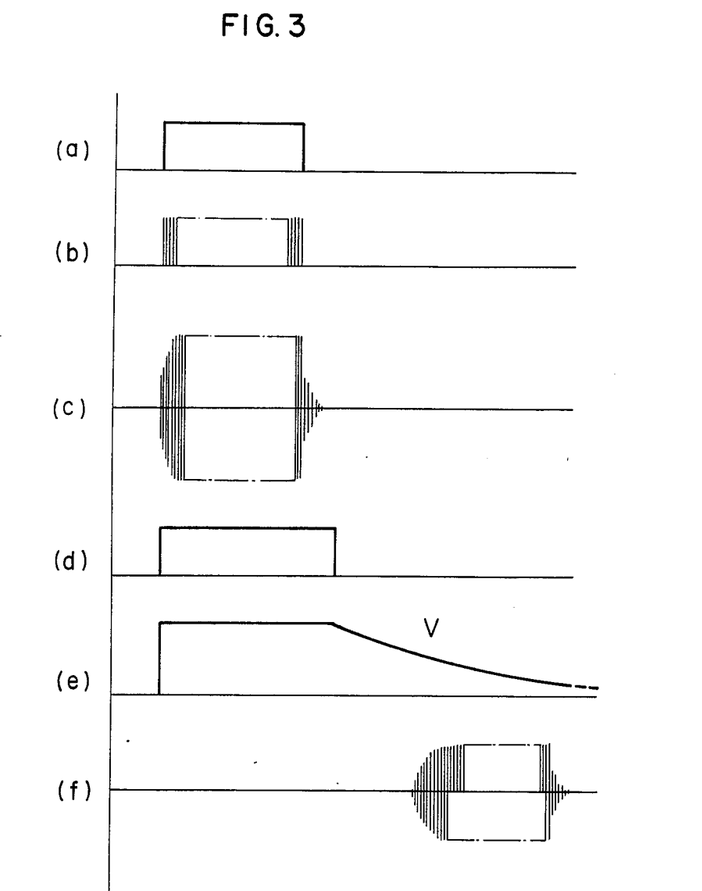

The operation of the embodiment comprising the above circuit elements will be described below with reference to the diagram of FIG. 3 showing waveforms produced at predetermined points of the circuit in FIG. 2.

In the ultrasonic distance measuring apparatus shown in FIG. 2, though it may not be necessary to mention in detail, a starting signal as shown by FIG. 3(a) is applied to the oscillator circuit 1 via the input terminal 1a by a certain external trigger operation, so that the oscillator circuit 1 supplies an output signal as shown in FIG. 3(b) to the transmission-receiving circuit 2.

In response to the output signal from the oscillator circuit 1, the transmission-receiving circuit 2 applies an exciting voltage signal to the ultrasonic wave sensor 3, whereby the ultrasonic wave sensor 3 transmits an ultrasonic wave as shown in FIG. 3(c) toward the object.

On the other hand, the monostable multivibrator circuit 15 supplied with a starting signal such as shown in FIG. 3(a) through the input terminal 1a of the oscillator circuit 1 is also actuated simultaneously with the oscillator circuit 1, and a pulse signal as shown by FIG. 3(d) is produced at the output terminal 15a thereof.

As seen from FIG. 2, the pulse signal of the monostable multivibrator circuit 15 is applied to the base of a transistor 10, so that the transistor 10 is maintained on as long as the pulse signal exists.

The reference voltage V supplied to the input terminal 9 of the comparator 7 is thus held at a predetermined level of the source voltage as long as the above-mentioned transistor 10 is maintained on. When the transistor 10 is turned off, the reference voltage V is determined by the terminal voltage of a capacitor 12 discharged through a variable resistor 13 and the thermosensitive element 14. This process is shown by the characteristic of FIG. 3(e), in which the reference voltage V is supplied to the comparator 7 as a voltage which is maintained at the predetermined level while the pulse output appears from the monostable multivibrator circuit 15 as shown in FIG. 3(d), and which gradually declines by the discharge operation immediately following the disappearance of the output pulse.

When the wave reflected on the object is received by the ultrasonic wave sensor 3 under this condition, the received signal amplifier circuit 4 produces a received signal as shown in FIG. 3(f).

This received signal is applied to the input terminal 8 of the comparator 7 and is compared with the reference voltage V already applied to the input terminal 9. At the time point when the level of the received signal exceeds the reference voltage v, the comparator 7 is inverted in operation thereby to produce a receiving time point signal for determining the time point of receiving the signal.

This receiving time point signal is used as an input signal for turning off the operation of a timer circuit (not shown in FIG. 2), whose time counting operation is started at the same time as the transmission of the ultrasonic wave as shown in FIG. 2, or as an input signal alternatively for controlling the operation of a given circuit (not shown) which is started simultaneously with the termination of the pulse signal of the monostable multivibrator 15.

Once the comparator 7 produces a receiving time point signal, therefore, a time signal corresponding to the distance to the object is produced from a counting circuit or the like mentioned above. Thus the time signal representing the distance to the object is usable for various purposes including the automatic focussing of a lens of an optical system or indication of the distance.

The above-described operations make up basic operations of the circuit shown in FIG. 2. The function to compensate for the temperature change will be described below.

Figure 4A:
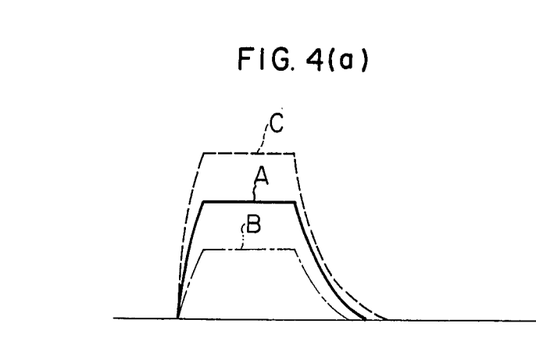
FIG. 4(a) shows the level change of the received ultrasonic signal as against temperature and FIG. 4(b) show the operation of a reference voltage generator circuit shown in FIG. 2.

It has been explained above that the ultrasonic wave propagating through the atmosphere has a propagation characteristic affected by the temperature change of the atmosphere as shown in FIG. 1(a). As a result, the waveform of the received signal shown by (f) in FIG. 3 is affected in the manner as shown in FIG. 4(a).

Specifically, the higher the temperature of the atmosphere, the lower the level of the received signal for the same object, when the humidity remains constant.

As a matter of fact the temperature change naturally changes the sound velocity, so that the time required for the reflected wave to return changes for the same object. Nevertheless, this time change is ignored in the waveform diagram of FIG. 4(a) which mainly shows the effect of the temperature on the receiving level.

The ultrasonic distance measuring apparatus according to the embodiment of the present invention shown in FIG. 2 comprises a thermo-sensitive element 14 such as a thermistor having a negative temperature coefficient as well as a variable resistor 13 in the discharge loop of the capacitor 12 for setting a reference voltage V.

Figure 4B:
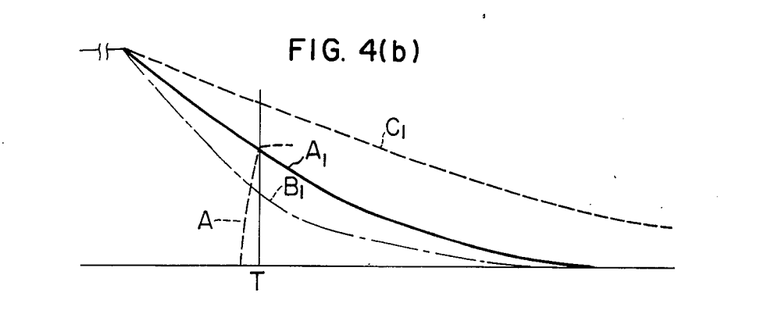

With a change of the atmospheric temperature, the resistance value of the thermo-sensitive element 14 undergoes a change, with the result that the discharge time constant of the capacitor 12 accordingly changes with temperature. The change of discharge time constant of the capacitor 12 means to change the characteristic of the gradually-decreasing portion of the reference voltage V shown in FIG. 3(e). In a specific example, the resistance value of the thermo-sensitive element 14, having a negative temperature coefficient, decreases and hence the discharge time constant descreases with an increase of temperature; while with a decrease of temperature, the resistance value of the element 14 increases and hence the discharge time constant also increases, resulting in the characteristic change as shown in FIG. 4(b).

Now, assume that the atmospheric temperature stands at 20° C. The comparator 7 explained with reference to FIG. 2 compares the output level of the received signal A shown in FIG. 4(a) with the characteristic $A_1$ of the reference voltage set as shown in FIG. 4(b) and delivers a comparison output signal at the time point T where the characteristic $A_1$ is exceeded. Specifically, the comparator 7 delivers the comparison output signal as a receiving time point signal at the time point where the output level A shown by dashed line in FIG. 4(b) crosses the reference voltage characteristic $A_1$. This time point is relied to produce a time signal representing the distance to the object.

Consider a case in which the atmospheric temperature has increased to 30° C. In this case, too, the same time point T must be detected as in the case of the temperature of 20° C. as far as the object distance remains the same and in order to produce the time signal representing the same distance. Since the output of the received signal decreases to B of FIG. 4(a) at 30° C. as compared with the level at 20° C., however, the comparator 7 naturally delivers the comparison output signal if the reference voltage characteristic remains at $A_1$ for 20° C. As a result, the time point where the characteristic B crosses $A_1$ is delayed, or in some cases, the two curves may fail to cross each other, thereby greatly deteriorating the accuracy of the distance measurement.

In order to obviate this inconvenience, the apparatus according to the present invention is so constructed that the reference voltage characteristic is determined as shown by $B_1$ by the thermo-sensitive element 14 or the like in such a manner that with an increase of the atmospheric temperature, the reference voltage characteristic accordingly decreases. Consequently, even if the output level of the received signal is lowered by the temperature rise, the same time point T is obtained, thus accomplishing the temperature compensation without any problem.

On the contrary, assume that the temperature has decreased to 10° C. lower than 20° C. The output level of the received signal takes the characteristic as shown by the characteristic C in FIG. 4(a) which is higher than the characteristic A of 20° C. As a result, as in the preceding case where the temperature increased to 30° C., it is impossible to obtain an accurate operating time point of the comparator 7 if the reference voltage characteristic remains at $A_1$ as at 20° C.

According to the present invention, however, the provision of the thermo-sensitive element 14 for controlling the characteristic of the reference voltage sets the reference voltage characteristic $C_1$ of FIG. 4(b) which is higher than the characteristic $A_1$ of 20° C.

In this way, the reference voltage characteristic is changed in accordance with the change of the output level due to a temperature change as in the preceding case where the temperature increased. This causes the comparator 7 to operate accurately at the time point T where the characteristic curves C and $C_1$ cross each other even when the output level of the received signal increases with a decreased temperature.

As explained above, the first embodiment of the present invention is such that the characteristic of the reference voltage of the comparator 7 for identifying the receiving time is controlled in accordance with the change of the output level of the received signal caused by the temperature change, that is, as seen from FIGS. 4(a) and 4(b), the thermo-sensitive element operates to reduce the reference voltage when the output level of the received signal is decreased with an increase of temperature.

As a result, disregarding change of the sound velocity due to temperature change, the operating time point of the comparator 7 is maintained constant regardless of the temperature for the same object, thus producing a very accurate time signal representing the distance to the object.

Further, the relation between the output level of the received signal and the reference voltage is not very considerably or adversely affected, thereby preventing a fatal false actuation or failure of actuation of the comparator 7 which otherwise might be caused by the output level of the received signal decreased excessively.

Figure 5:
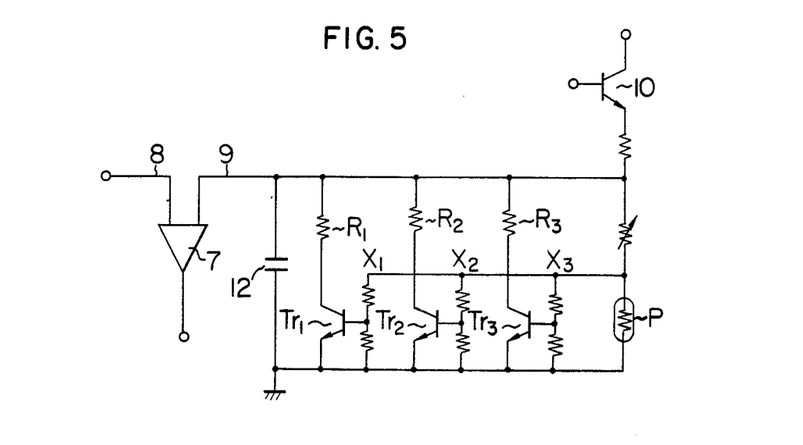
FIG. 5 shows a reference voltage generator circuit of the ultrasonic distance measuring apparatus according to another embodiment of the present invention.

The aforementioned embodiment is not necessarily limited to the circuit configuration shown in FIG. 2, but a posistor P whose characteristic changes positively with temperature may be used as in the configuration shown in FIG. 5.

In the embodiment under consideration, the terminal voltage of the posistor P is divided by a plurality of dividing circuits $X_1$, $X_2$ and $X_3$ of different dividing ratios, the outputs of which are applied to transistors $Tr_1$, $Tr_2$ and $Tr_3$ respectively so that the turning on and off of the transistors is digitally controlled in accordance with the temperature. In this way, the conditions of the resistors $R_1$, $R_2$ and $R_3$ connected to the capacitor 12 are made variable to thereby control the discharge time constant of the capacitor 12. Namely, at temperatures up to 20° C., for instance, the transistor $Tr_1$ alone is turned on; the transistor $Tr_2$ in addition to the transistor $Tr_1$ is turned on between 20° C. and 30° C.; and all the transistors are turned on at temperatures higher than 30° C., thus controlling digitally the discharge time constant of the capacitor 12 differently for each temperature range.

Furthermore, the thermo-sensitive element having a positive or negative temperature characteristic may of course be replaced by a semiconductor thermo-sensitive element.

According to the first embodiment described above, the change of propagation characteristic of the ultrasonic wave through the atmosphere with temperature change is compensated for. As shown in FIG. 1(b), however, the propagation characteristic of the ultrasonic wave through the atmosphere is also greatly affected by the change of humidity, in which case an error of distance measurement similar to the one occurred due to temperature change is caused. Means for compensating for the humidity change will be explained below as a second embodiment of the present invention.

Figure 6:
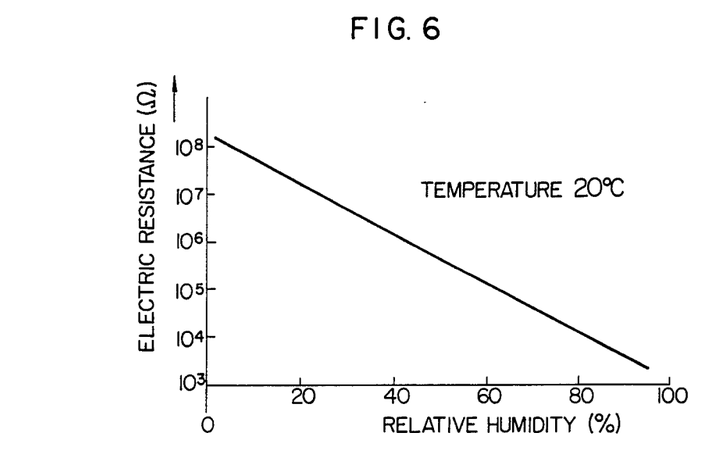
FIG. 6 shows a characteristic of a humidity sensor having a negative humidity coefficient.

FIG. 6 shows the characteristic of a typical ceramic humidity sensor, the electric resistance of which changes with humidity if the temperature remains the same.

Figure 7:
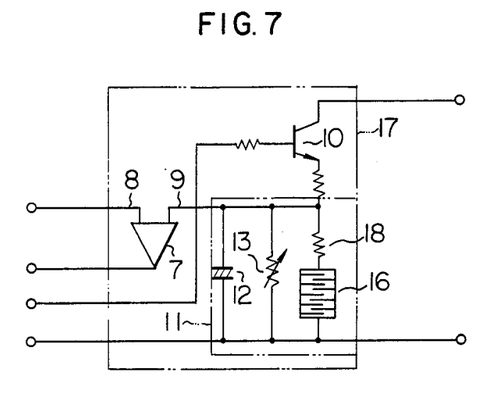
FIG. 7 is a circuit diagram showing still another embodiment of the reference voltage generator circuit of the distance measuring apparatus according to the present invention.

An electrical circuit of an ultrasonic diatance measuring apparatus according to the second embodiment having this humidity sensor is shown in FIG. 7, in which the circuit elements similar to those in FIG. 2 are denoted by the same reference numerals as in FIG. 2, and the contents of each block are not shown for facilitating the understanding.

As apparent from FIG. 7, the humidity sensor 16 is connected to the reference voltage generator circuit 11 described with reference to FIG. 2. It will be seen from FIG. 1(b) that if the temperature remains unchanged, the propagation characteristic of the ultrasonic wave through the atmosphere changes at substantially the same rate (i.e., with the substantially same gradient) with respect to humidity. For this reason, it is sufficient to compensate for the humidity characteristic for a given typical temperature. Accordingly, the second embodiment will be described below with reference to the characteristic at the temperature of 20° C. shown in FIG. 1(b).

As seen from FIG. 1(b), if the relative humidity is changed to 20% for example from the reference level of 50%, the output level of the received signal increases by about 4 dB, whereas a change of the relative humidity to 80% causes the output level of the received signal to decrease to about −2 dB, thus following a curve of negative trend with respect to humidity change.

The reference voltage characteristic of the comparator 7 is corrected in such a manner as to compensate for this negative trend of the humidity versus signal level curve. The humidity sensor 16 included in the humidity compensator circuit 17, which has the characteristic as shown in FIG. 6, increases in resistance value with a decrease of humidity. Therefore, if the circuit configuration as shown in FIG. 7 is realized, the discharge time constant of the capacitor 12 increases in a manner similar to the case of FIG. 2, with the result that the circuit operates to increase the reference voltage in accordance with humidity.

Figure 8A:
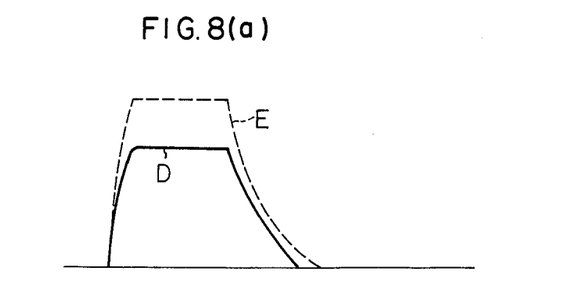
FIG. 8(a) shows changing mode of a received ultrasonic wave signal depending upon atmospheric humidity and FIG. 8(b) shows operation mode of the circuit shown in FIG. 7.
Figure 8B:
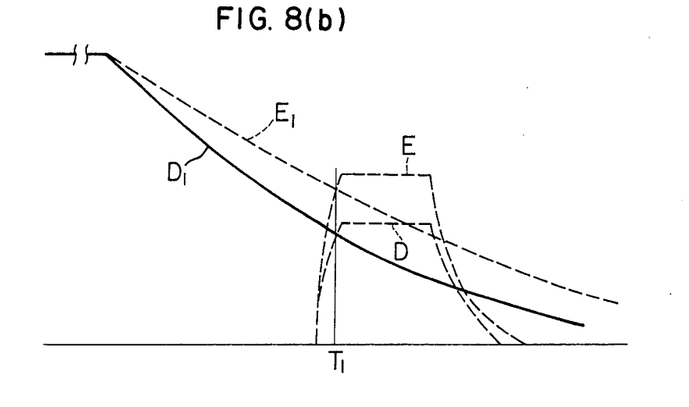

The effect of humidity on the received signal and the change of reference voltage characteristic with respect to humidity in the circuit of FIG. 7 are shown in FIGS. 8(a) and 8(b).

As in the case of the compensation for the variation in the received signal level and the reference voltage characteristic caused by temperature change, discussion will now be made about the operating point of the comparator 7 derived from the output level of the received signal shown by D in FIG. 8(a) and the reference voltage characteristic curve shown by $D_1$ in FIG. 8(b) at the standard humidity of 50%. The output level waveform D crosses the reference voltage characteristic curve $D_1$ at the time point $T_1$ whereby a time signal corresponding to the distance to the object is set.

Assume, on the other hand, that the humidity has changed to 20%. As shown by E in FIG. 8(a), the output level of the received signal increases from D. Since the characteristic curve of the reference voltage is also changed in accordance with the change of humidity from $D_1$ to $E_1$ by the humidity sensor 16 in FIG. 7, however, the received signal output level E and the reference voltage characteristic curve $E_1$ for the humidity of 20% shown by the dashed line in FIG. 8(b) cross each other at the same time point $T_1$ as the output level D and the reference voltage characteristic curve $D_1$ for the humidity of 50% cross each other. In other words, the time point at which the comparator 7 is actuated remains unchanged at $T_1$.

As described above, the circuit configuration of FIG. 7 produces a predetermined time signal representing a distance to an object regardless of the humidity, thus realizing a distance measuring operation of high accuracy.

According to the above-mentioned second embodiment of the present invention, the variation in the propagation in the atmosphere caused by a humidity change is compensated. The humidity sensor 16 is not necessarily made of ceramics but may take any form of various types of humidity sensors.

Further, the variable resistor 13 and the resistor 18, which are used for matching the characteristics of the humidity sensor 16, may be used for various types of humidity sensors or for matching the reference voltage characteristic with the output level characteristic of the received signal.

Description is made above about the compensation means for variations of the propagation characteristics of ultrasonic wave in the atmosphere against humidity or temperature in the first and second embodiments respectively. In natural environment, however, temperature and humidity generally change at the same time, and a third embodiment described below is capable of compensating for changes of temperature and humidity at the same time by the circuit configuration shown in FIG. 9.

Figure 9:
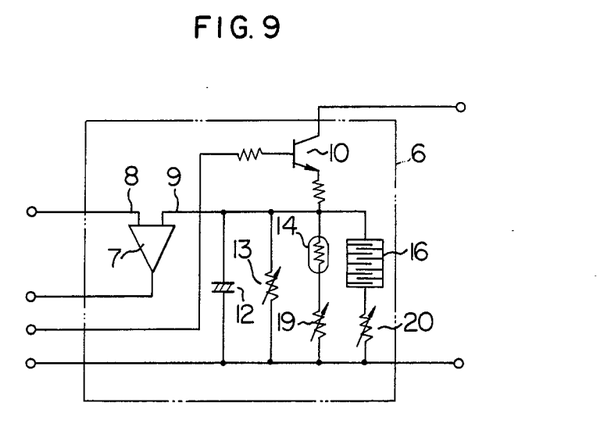
FIG. 9 is a circuit diagram of yet another embodiment of the reference voltage generator circuit.

The circuit elements performing the same operations as in the preceding embodiments are denoted by the same reference numerals as before and will not be described again. Variable resistors 19 and 20 are provided for matching the sensor characteristic and may include nonlinear elements such as a diode or varistor or, additionally, a semiconductor circuit for obtaining a desired matching ability.

As seen from the circuit configuration shown in FIG. 9, the embodiment under consideration is so constructed that a thermo-sensitive element 14 and a humidity sensor 16 are connected in parallel to each other across a capacitor 12 for supplying a reference voltage, so that the discharge time constant of the capacitor 12 for determining the reference voltage characteristic changes with change in either temperature or humidity.

As a result, even when the output level of the received signal changes with change of the atmospheric characteristic such as temperature or humidity, such changes are compensated for at the same time.

The first, second and third embodiments concern circuit means for eliminating the distance measurement error by compensating for the variations of the received signal through the compensation for the reference voltage characteristic. The present invention does not necessarily require such circuit means, but a fourth embodiment described below inluding a circuit shown in FIG. 10 is also capable of accomplishing such a purpose.

Figure 10:
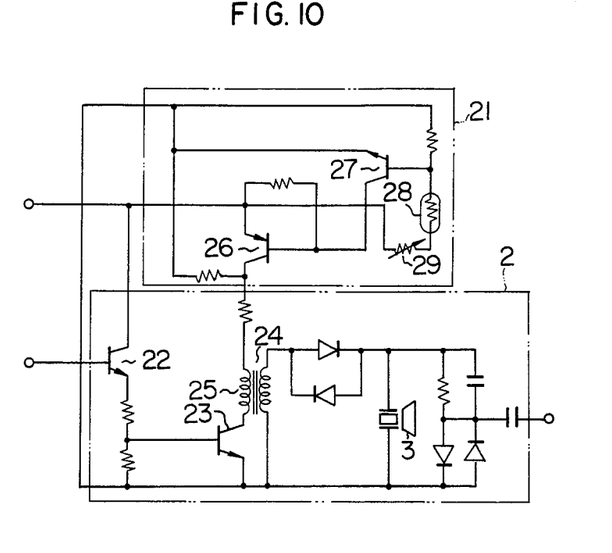
FIG. 10 is a circuit diagram showing another embodiment of the ultrasonic wave distance measuring apparatus according to the present invention.

The circuit section shown by a chain line 2 in FIG. 10, which has the same function as the ultrasonic wave receiving circuit 2 in FIG. 2 and has the same reference numerals as the circuit 2, will not be described again. The fourth embodiment is implemented to control the ultrasonic wave transmission output in accordance with temperature in order to compensate for the temperature dependency of the atmospheric propagation of the ultrasonic wave, and includes a transmission output control circuit section designated by a chain line 21.

As described above, when a burst signal b is applied to the transistor 22, a transistor 23 is turned on in response thereto. In view of the fact that a transistor 26 is connected to the primary winding 25 of a transmission transformer 24 through a resistor, however, the output to the primary winding 25 is controlled in accordance with the operating condition of the transistor 26.

This transistor 26 is further controlled by a thermo-sensitive element 28 such as a thermistor connected to the base circuit of a transistor 27, with the result that the output level to the transmission transformer 24 can be controlled in accordance with temperature.

Figure 11:
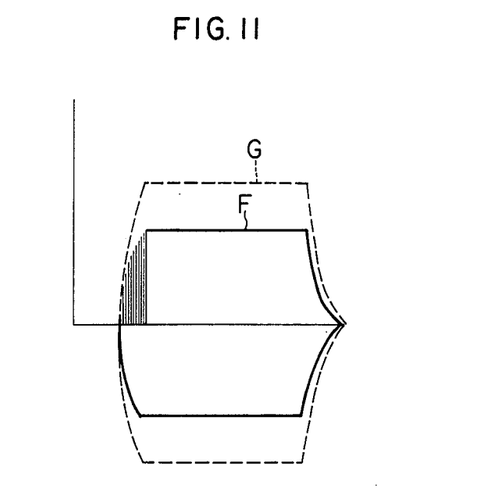
FIG. 11 is a diagram showing the operation mode of the embodiment of FIG. 10.

Assume, for instance, that the atmospheric temperature has increased from 20° C. to 30° C. The transmission level of the ultrasonic wave under transmission is increased from the level of solid line F for 20° C. to the level of the chain line G in FIG. 11 thereby to compensate for the error which otherwise might be caused by the decrease of the received signal output which in turn is attributable to a deteriorated propagation characteristic at high atmospheric temperatures.

A variable resistor 29 is for appropriately controlling and adjusting the compensation amount.

In this manner, the apparatus according to the fourth embodiment controls the transmission level of the ultrasonic wave under transmission in accordance with temperature. By use of the humidity sensor described with reference to FIG. 7, on the other hand, the transmission level of the ultrasonic wave is capable of being controlled in accordance with humidity, or such heat and humidity sensors may be used in combination for the same purpose of transmission control of the ultrasonic wave under transmission.

As another modification, the humidity compensasion may be effected by the transmission output control circuit section 21 while the temperature compensation may be effected by compensating the reference voltage.

It will be understood from the foregoing description that according to the present invention, there is provided an ultrasonic distance measuring apparatus, in which the receiving time is determined by use of a thermo-sensitive element or a humidity sensor, and the reference voltage characteristic of a comparator for producing an output signal for setting a time signal corresponding to the distance to an object is controlled, or means for compensating for the changes in the atmospheric characteristics is provided for controlling the transmission level of the ultrasonic wave transmitted toward the object, thus attaining a high accuracy of distance measurement regardless of the ultrasonic wave whose propagation is greatly affected by the atmospheric characteristic changes.

We claim:

1. An ultransonic distance measuring apparatus comprising:
   a transmitter for transmitting an ultransonic wave toward an object;
   a receiver for receiving an aultrasonic wave reflected from said object;
   comparator means for comparing a predetermined reference level with the level of a reflection signal electrically converted from said reflected wave and producing a receiving signal when the level of said reflection signal exceeds said reference level, thereby enabling a time to be determined from the transmission of said ultrasonic wave to the receiving of the reflected wave representing the distance to said object; and
   an atmospheric characteristic compensating means for compensating for a variation of a propagation characteristic of said ultrasonic wave due to a variation of an atmospheric characteristic, said compensating means comprising a sensor means for detecting a characteristic of the atmosphere through which said ultrasonic wave is propagated, a reference voltage generator circuit having a capacitor connected with said sensor means adapted to be charged to a predetermined voltage and to be discharged through and under control of said sensor means responsive to the detected characteristic of the atmosphere in order to supply said reference level to said comparator means, and a switching element for controlling the charge period of said capacitor.

2. An apparatus according to claim 1, wherin said sensor means comprises a parallel connection of a thermo-sensitive element having a negative temperature coefficient and a variable resistor.

3. An apparatus according to claim 1, wherein said sensor means comprises a series connection of a thermo-sensitive element having a positive temperature coefficient and a variable resistor, a parallel connection of a plurality of differentresistance resistors connected in parallel with said thermo-sensitive element, and a plurality of switch means connected across said series connection, with each switch means having a control terminal connected to each of said different-resistance resistors.

4. An apparatus according to claim 1, wherein said sensor means comprises a parallel connection of a variable resistor with a circuit which includes a humidity-sensitive element having a negative humidity coefficient.

5. An apparatus according to claim 1, wherein said sensor means comprises a parallel connection of a first variable resistor, a first series connection of a second variable resistor and a thermo-sensitive element, and a second series connection of a third variable resistor and a humidity-sensitive element.

6. An ultrasonic distance measuring apparatus, comprising:
   a transmitter for transmitting an ultrasonic wave toward an object;
   a receiver for receiving an ultrasonic wave reflected from said object;
   comparator means for comparing a predetermined reference level with the level of a reflection signal electrically converted from said reflected wave and producing a receiving signal when the level of said reflection signal exceeds said reference level, thereby enabling a time to be determined from the transmission of said ultrasonic wave to the receiving of the reflected wave representing the distance to said object; and
   an atmospheric characteristic compensating means for compensating for a variation of a propagation characteristic of said ultrasonic wave due to a variation of an atmospheric characteristic, said compensating means comprising sensor means for detecting a characteristic of the atmosphere through which said ultrasonic wave is propagated, and control circuit means for changing a transmission level characteristic of the ultrasonic wave transmitted from said transmitter in response to the atmosphere characteristic detected by said sensor means.

7. An apparatus according to claim 6, wherein said control circuit means comprises an input control circuit for controlling an energy level supplied to a primary winding of a transmission transformer for supplying an excitation voltage to an ultrasonic wave sensor making up said transmitter.

8. An apparatus according to claim 7 wherein said input control circuit comprises a switch circuit connected to one end of said primary winding of said transmission transformer and controlled by an oscillation circuit adapted to oscillate at the frequency of the transmitted ultrasonic wave, and a voltage control circuit connected to the other end of said primary winding and including a first transistor having a base current controlled by said sensor means, and a second transistor controlled by said first transistor.

* * * * *